US010565883B2

(12) United States Patent
Gannon et al.

(10) Patent No.: US 10,565,883 B2
(45) Date of Patent: Feb. 18, 2020

(54) SYSTEMS AND METHODS FOR MANAGING PRACTICE AIRSPACE (71) Applicant: HONEYWELL INTERNATIONAL INC., Morris Plains, NJ (US)

(72) Inventors: Aaron Gannon, Anthem, AZ (US); Jary Engels, Peoria, AZ (US); Chris Hamblin, League City, TX (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 203 days.

(21) Appl. No.: 15/649,138

(22) Filed: Jul. 13, 2017

(65) Prior Publication Data
US 2019/0019419 A1 Jan. 17, 2019

(51) Int. Cl.
G08G 5/00 (2006.01)
G01C 23/00 (2006.01)
(Continued)

(52) U.S. Cl.
CPC .......... *G08G 5/0034* (2013.01); *G01C 23/00* (2013.01); *G08G 5/0013* (2013.01);
(Continued)

(58) Field of Classification Search
CPC . G09B 9/00; G09B 9/08; G09B 9/003; G09B 9/02; G09B 9/048; G09B 9/05; G09B 9/063; G09B 9/301; G09B 9/085; G09B 9/20; G09B 9/30; G09B 9/302; G09B 9/42; G09B 19/165; G09B 5/02; G06F 3/04815; G06F 3/0482; G08G 5/0013; G08G 5/0021; G08G 5/0034; G08G 5/0039; G01C 23/00
(Continued)

(56) References Cited

U.S. PATENT DOCUMENTS 4,196,474 A 4/1980 Buchanan et al.
4,642,775 A * 2/1987 Cline ..................... G01C 23/00
701/528
(Continued)

FOREIGN PATENT DOCUMENTS

EP 1218698 A1 7/2002
EP 1764759 A1 3/2007
(Continued)

OTHER PUBLICATIONS

Extended EP Search Report for Application No. 18183023.3 dated Dec. 13, 2018.
(Continued)

Primary Examiner — Anthony R Jimenez
(74) Attorney, Agent, or Firm — Lorenz & Kopf, LLP (57) ABSTRACT A practice airspace management system includes a control unit configured to receive user inputs from a first user and to generate a first training plan based on the user inputs. The control unit is further configured to generate display commands representing the first training plan on a navigation map. The practice airspace management system further includes a display device coupled to receive the display commands from the control unit and configured to display a navigation map view that includes the navigation map and a first training plan symbol representing the first training plan on the navigation map.

17 Claims, 9 Drawing Sheets (51) Int. Cl.
*G09B 5/02* (2006.01)
*G09B 19/16* (2006.01)
*G06F 3/0481* (2013.01)
*G06F 3/0482* (2013.01)

(52) U.S. Cl.
CPC .............. *G08G 5/0021* (2013.01); *G09B 5/02* (2013.01); *G09B 19/165* (2013.01); *G06F 3/0482* (2013.01); *G06F 3/04815* (2013.01); *G08G 5/0039* (2013.01)

(58) Field of Classification Search
USPC ........................................................ 701/454
See application file for complete search history.

(56) References Cited

U.S. PATENT DOCUMENTS

| | | | |
|---|---|---|---|
| 6,289,277 B1* | 9/2001 | Feyereisen | G01C 21/005 |
| | | | 340/945 |
| 6,718,236 B1 | 4/2004 | Hammer et al. | |
| 7,262,730 B2 | 8/2007 | Larsson et al. | |
| 8,145,366 B1 | 3/2012 | Haering, Jr. | |
| 8,164,485 B2* | 4/2012 | Prinzel, III | G01C 23/00 |
| | | | 340/945 |
| 8,362,925 B2 | 1/2013 | Brinkman et al. | |
| 2006/0146048 A1 | 7/2006 | Wright et al. | |
| 2009/0140910 A1 | 6/2009 | Bailly et al. | |
| 2010/0250026 A1 | 9/2010 | Deker et al. | |
| 2014/0248588 A1 | 9/2014 | Williams et al. | |
| 2014/0336867 A1 | 11/2014 | Covington et al. | |

FOREIGN PATENT DOCUMENTS

| | | |
|---|---|---|
| EP | 1835369 A2 | 9/2007 |
| EP | 2704125 B1 | 7/2015 |
| WO | 2014/096493 A1 | 6/2014 |

OTHER PUBLICATIONS

Marsh, R., et al.; Aerospace Aircraft Information Display System for Flight Operations in North Dakota; Conference: Mar. 1-8, 2014.

* cited by examiner

SYSTEMS AND METHODS FOR MANAGING PRACTICE AIRSPACE

TECHNICAL FIELD

The present invention generally relates to aircraft systems and methods, and more particularly relates to aircraft systems and methods for managing practice airspace.

BACKGROUND

Pilots are required to undergo flight training. For example, pilots may perform flight training maneuvers in a practice area. However, such areas are typically ad hoc arrangements in which the pilots self-monitor for traffic by maintaining radio and visual separation. However, improvements to these arrangements may be beneficial.

Accordingly, it is desirable to provide improved practice airspace information and management to one or more users. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a practice airspace management system includes a control unit configured to receive user inputs from a first user and to generate a first training plan based on the user inputs. The control unit is further configured to generate display commands representing the first training plan on a navigation map. The practice airspace management system further includes a display device coupled to receive the display commands from the control unit and configured to display a navigation map view that includes the navigation map and a first training plan symbol representing the first training plan on the navigation map.

In accordance with another exemplary embodiment, a method is provided for managing practice airspace. The method includes receiving, at a control unit, user inputs from a first user; generating, with the control unit, a first training plan based on the user inputs; generating, with the control unit, display commands representing the first training plan on a navigation map; and displaying, on a display device and based on the display commands, a navigation map view that includes the navigation map and a first training plan symbol representing the first training plan on the navigation map.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein relate to airspace information and management systems and methods for defining and displaying practice airspace information for one or more pilot users, instructor users, and/or control center users. Generally, the term "practice airspace" (or "training airspace") refers to a designated geographical zone or collection of zones in an area for pilots (or student pilots) to practice flight maneuvers in accordance with a training plan. Unless otherwise noted, the "user" of the exemplary embodiments discussed below may be the pilot that is planning to fly in the practice airspace or is currently flying in the practice airspace, or the flight instructor that is monitoring or evaluating the pilot. Additionally, exemplary embodiments may display the practice airspace associated with multiple users in a particular area. In one embodiment, the user, as well as other users managing training plans, may be "affiliated" users that subscribe to a service or common system for cooperating with respect to practice airspace. In other embodiments, all practice airspace users in a particular area may be represented. The systems and methods described herein may be utilized in, or with respect to, any type of aircraft, including a helicopter, airplane, or unmanned vehicle.

Figure 1:
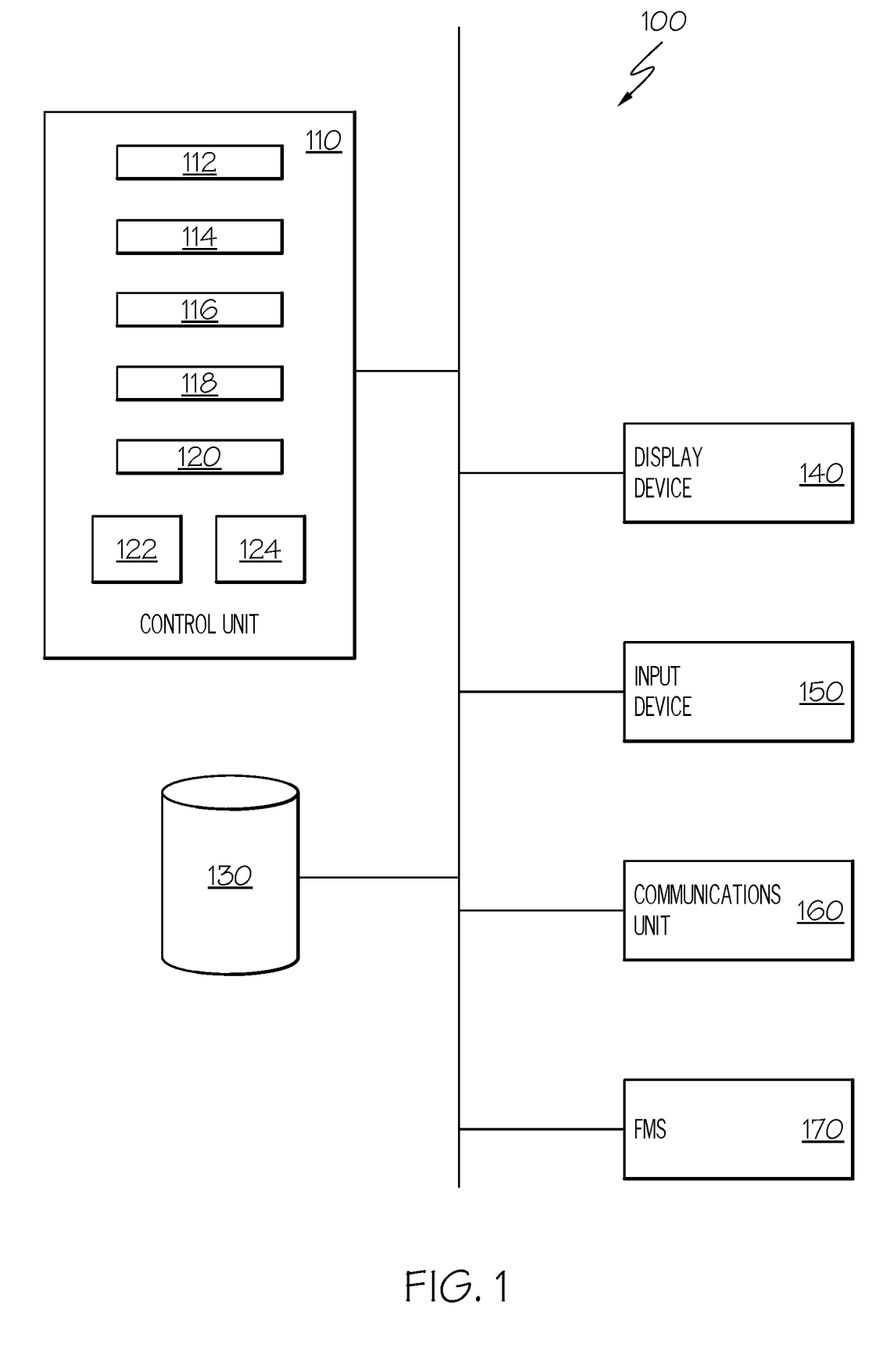
FIG. 1 is a block diagram of a practice airspace management system in accordance with an exemplary embodiment.

FIG. 1 depicts a block diagram of an exemplary practice airspace management system (or practice airspace information system) 100. As described in greater detail below, the practice airspace management system 100 provides practice airspace management for a geographical area and/or sub-portion of the geographical area. In one exemplary embodiment, the system 100 may be incorporated into one or more aircraft, while in other embodiments, the system 100 may be implemented on the ground, such as in a control center or airport location. In further embodiments, aspects of the system 100 may be distributed or shared across a number of these locations. In other words, each user may have an instance of the system 100 that cooperates with corresponding systems of other users, or the system 100 may be considered a common system 100 and multiple users may interface with the common system 100 to create and view training plans.

Generally, the description below refers to at least a partial implementation on a particular aircraft associated with a pilot or instructor as an "ownship," although information from sources outside of the aircraft may be considered. As an example, an instructor may define one or more training plans on a ground-based interface for a pilot user to implement within the airspace. During flight, the training plans may be visually represented in a navigation map view on an aircraft display for the ownship and for other aircraft having affiliated users. Further, the system may update the navigation display view, as well as other types of views, relative to real-time flight information and enable modifications of the training plans.

In the exemplary embodiment shown, the practice airspace management system 100 includes a control unit 110, a database 130, a display device 140, an input device 150, a communications unit 160, and/or a flight management system 170 on a data communications bus or systems bus. Generally, the control unit 110 controls the function and operation of the system 100, and particularly manages the collection, generation, evaluation, modification, and display of practice airspace information, as described in greater detail below. The control unit 110 may be considered to include one or more functional units or modules 112, 114, 116, 118, 120 (e.g., software, hardware, or combinations thereof). As an example, each of the modules 112, 114, 116, 118, 120 may be implemented with a processor 122 and memory 124. In the depicted embodiment, the control unit 110 includes a schedule module 112, a map module 114, an ownship module 116, a display module 118, and a message module 120. FIG. 1 depicts one exemplary organization, and other embodiments may perform similar functions with alternative organization or implementation. Additional details about operation of these modules 112, 114, 116, 118, 120 will be provided below.

In one exemplary embodiment, the control unit 110 may be associated with a navigation display, although other implementations may be provided in one or more of a primary flight display, vertical display, near-to-eye display system, or other type of display for an individual aircraft, a control center, or a stand-alone device. During general operation, the control unit 110 receives and/or retrieves user inputs (e.g., from input device 150); mapping information, navigation information, and flight information (e.g., from the flight management system 170, database 130, and/or communications unit 160); and training plan information for other aircraft (e.g., from the communications unit 160). The control unit 110 generates a training plan for an ownship aircraft with one or more training plan characteristics, including location, time, altitude, and/or activity. The control unit 110 may also function as a graphics display generator to generate display commands associated with the ownship training plan and other aircraft training plans. The display commands are provided to the display device 140 for display to users in the form of a navigation map view with symbology representing the training plans, as well as any other relevant flight information, terrain information, and flight path information. The visual display is updated by the control unit 110 as flight information changes and/or the training plans are modified and implemented. More specific functions of the will be discussed below.

As noted above, the control unit 110 (as well as other components of system 100) may be implemented with a computer processor 122, including general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processor 122 may execute instructions stored in memory 124 to carry out the functions, techniques, and processing tasks or methods associated with operation of the control unit 110. The memory 124 may store computer readable instructions, firmware and software programs and be tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

Database 130 is coupled to control unit 110 and may be a memory device (e.g., non-volatile memory, disk, drive, tape, optical storage device, mass storage device, etc.) that stores digital flight information as either absolute coordinate data or as a function of aircraft position. In particular, the database 130 may store information associated with the creation and implementation of the training plans discussed herein. Database 130 can additionally include other types of aircraft and navigation information, such as information used to calculate flight path and determine flight time and departure information. Database 130 may also include, for example, a terrain database, which includes the locations and elevations of natural and manmade terrain. Database 130 may further include other types of databases, such as a weather database, a flight plan database, an obstacle database, a geopolitical database, a terminal airspace database, and/or a special use airspace database.

The data in database 130 may be used to compare aircraft position with various aspects of the training plan and terrain environment to subsequently generate a dynamic navigation map view relative to the aircraft, as discussed below. The data in the database 130 may be uploaded prior to flight or received from external sources, such as an airport transmitter or onboard sensors. Database 130 may further include aircraft and/or airspace data obtained from the Federal Aviation Administration (FAA), other government or industry groups, and aircraft manufacturers.

The display device 140 is coupled to the control unit 110 and may include any device or apparatus suitable for displaying airspace information or other data associated with aircraft, including various types of computer generated symbols and information representing training plans, as well as weather, pitch, heading, flight path, airspeed, altitude, runway information, waypoints, targets, obstacle, and terrain data, in an integrated, multi-color or monochrome form. The display device 140 and/or control unit 110 may include a graphics display generator for generating the appropriate symbology on the screen of the display device 140. In one embodiment, the display device 140 may be an aircraft flight display located within a cockpit of the aircraft. It should be appreciated that, in practice, the display device 140 may be located outside the aircraft (e.g., on the ground as part of an air traffic control center or another command center). Any suitable type of display medium capable of visually presenting multi-colored or monochrome flight information for a pilot or other flight crew member may be provided, such as, for example, various CRT, flat-panel, and other types of display systems (e.g., LCDs, OLED displays, plasma displays, projection displays, HDDs, HUDs, etc.).

The input device 150 is coupled to the control unit 110 and adapted to allow the user to interact with the system 100. Such an input device 150 may be realized as a keypad, touchpad, keyboard, mouse, touchscreen, joystick, microphone, or another suitable device adapted to receive input from a user.

The communications unit 160 may be any suitable device (e.g., a transceiver) for sending and receiving information to and from the control unit 110. In some embodiments, communications unit 160 may be configured to receive radio frequency transmissions, satellite communication transmissions, optical transmissions, laser light transmissions, sonic transmissions or transmissions of any other wireless form of data link. The communications unit 160 may also communicate with other aircraft and/or a control center, such as Air Traffic Control (ATC), to exchange information regarding flight activity in the area. As an example, the communications unit 160 may be configured to send and receive ADS-B information to and from other aircraft and/or to send and receive training plan information via an uplink service.

The flight management system 170 is coupled to the control unit 110 and may provide real-time data regarding operation of the aircraft to the control unit 110, including navigation data associated with the current position and flight direction (e.g., heading, course, track, etc.). The navigation data may also include information about the airspeed, altitude, pitch, flight path, intended destination, takeoff and landing information, and other important flight information. In one embodiment, the flight management system 170 may facilitate the generation and display of training plan information for the aircraft. The flight management system 170 may include any suitable position and direction determination devices that are capable of providing relevant flight information, including systems and devices such as, for example, an Inertial Reference System (IRS), Air-data Heading Reference System (AHRS), and/or a global positioning system (GPS), as well as various types of altitude sensors, attitude sensors, terrain sensors, and other types of ranging sensors.

As introduced above, the system 100 functions to collect, evaluate, and present practice airspace information for one or more users, including training plans for the ownship and other aircraft in the area. In one exemplary embodiment, the system 100 particularly functions to collect, evaluate, and present such information to the user in a navigation map view, as discussed in greater detail below.

Figure 2:
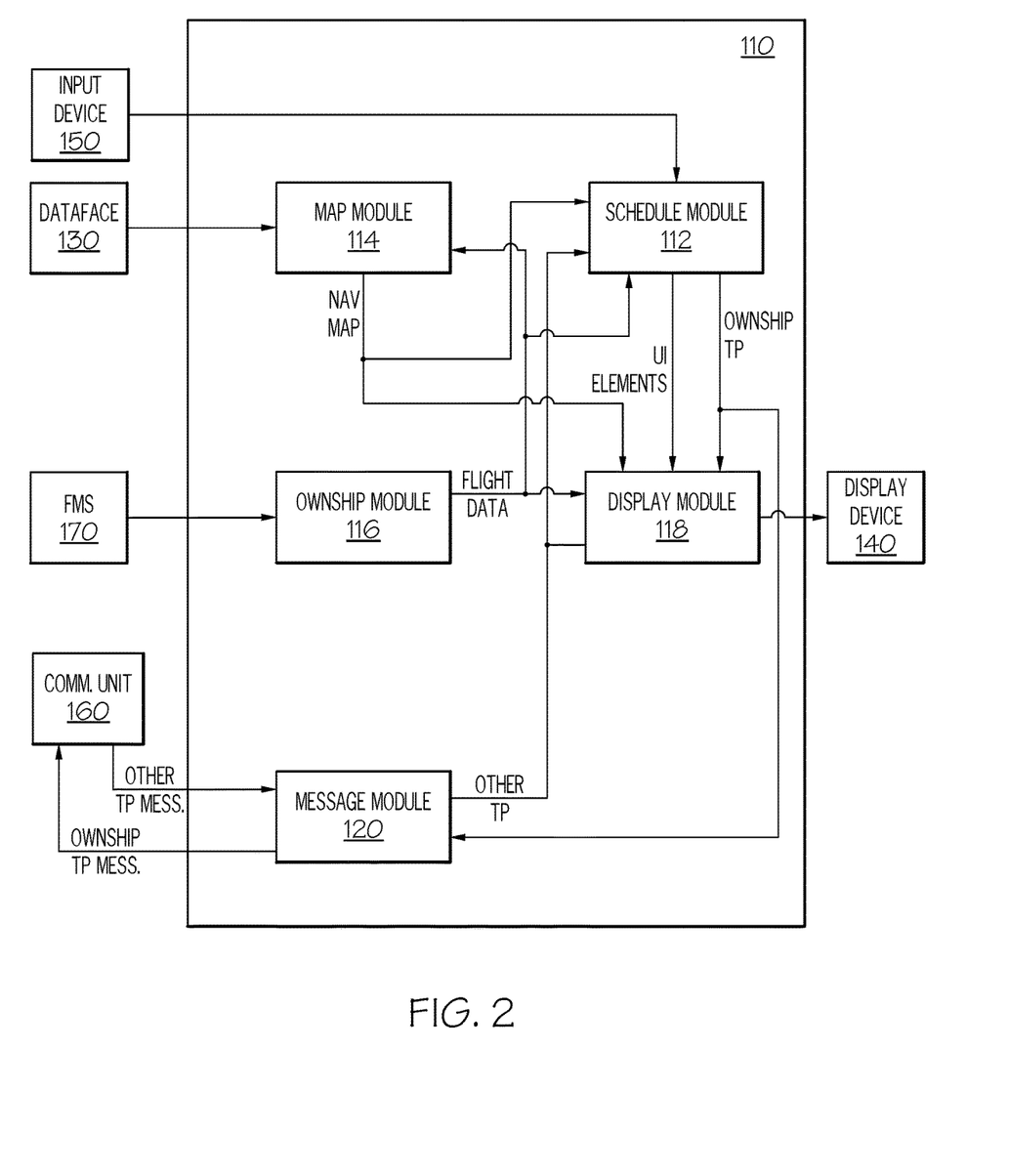
FIG. 2 is a block diagram of a control unit of the practice airspace management system of FIG. 1 in accordance with an exemplary embodiment.

FIG. 2 is a block diagram of the control unit 110 of the practice airspace management system 100 of FIG. 1 in accordance with an exemplary embodiment. FIG. 2 also depicts exemplary data flows associated with the modules 112, 114, 116, 118, 120 of the control unit 110 to facilitate a description of the operation.

Generally, the schedule module 112 functions to organize and control the formation and implementation of training plans for one or more users. In one exemplary embodiment, the schedule module 112 presents a graphical user interface to the user to receive user inputs for the creation, implementation, and updating of a training plan for the user (e.g., as an ownship training plan) and for other aircraft (e.g., other aircraft training plans). As such, the schedule module 112 may store and/or retrieve information associated with training plan characteristics, such as locations, altitude ranges, timing, and maneuvers, as well as airspace plotting algorithms to create, monitor, and modify training plans within the airspace of the area. Additional details will be discussed below after introduction of the other modules 114, 116, 118, 120.

The map module 114 functions to retrieve and/or format a map of the area. As discussed below, the map may be a plan view, navigation map. In one exemplary embodiment, the map module 114 may retrieve the map information from database 130 for an area selected by the user and/or based on the current location of the aircraft or user. The map information may be provided to the schedule module 112 for the management of the training plans and the display module 118 for presentation to the user, as discussed below.

The ownship module 116 may collect or otherwise receive flight and/or navigation information associated with the ownship aircraft, including information about other aircraft from the ownship aircraft systems. For example, the ownship module 116 may receive information regarding the location, speed, direction, altitude, and the like for the ownship aircraft from the flight management system 170. The ownship module 116 may also receive other types of relevant information from the flight management system 170 or other systems, such as information from a source of weather data, a terrain avoidance and warning system (TAWS), a traffic and collision avoidance system (TCAS), ADS-B system, an instrument landing system (ILS), and a runway awareness and advisory system (RAAS). The ownship module 116 generally provides this information to facilitate operation of the schedule module 112, map module 114, and/or the display module 118 for generating, monitoring, modifying, and displaying the training plans, as discussed below.

The display module 118 generally receives the training plan from the schedule module 112, the flight and navigation data from the ownship module 116, and the map data from the map module 114. The display module 118 generates display commands based on this information for presentation to the user on the display device 140. The display module 118 may also facilitate the receipt of user input regarding the training plans, as described below.

The message module 120 generally functions to format and send messages to other aircraft and/or control centers via the communications unit 160 with ownship training plan information from the schedule module 112, and to receive and parse corresponding messages from other aircraft and control centers to determine the location, time, altitude range, and other characteristics of the other aircraft training plans. Such other aircraft training plan information is provided to the display module 118 and/or the schedule module 112.

As noted above, the system 100, particularly the control unit 110, functions to create, display, and modify training plans for practice airspace. In particular, the training plans and other airspace information may be implemented as an overlay on a navigation map. In one embodiment, the system 100 functions as an interface to accept user inputs for the management of the training plans, examples of which are discussed below with reference to FIGS. 3-9.

An exemplary visual display 200 is depicted in FIGS. 3-9 and includes a plan navigation map 210 that facilitates creation and implementation of the training plans. As noted above, the navigation map 210 may be based on one or more sectional charts, topographic maps, digital maps, or any other suitable commercial or military database or map. Although FIGS. 3-9 depict a top view of the navigation map 210, in practice, alternative embodiments may utilize various perspective views, such as side views, three-dimensional views (e.g., a three-dimensional synthetic vision display), angular or skewed views, and the like. As noted above, the map module 114 may generate the information depicted on the navigation map 210 and the associated symbology (e.g., based on data from the database 130, flight management system 170, and communications unit 160) and provide the such information to the schedule module 112 for management of the training plans and to the display module 118 for display to the user, various examples of which are shown in FIGS. 3-9 and discussed below.

Figure 3:
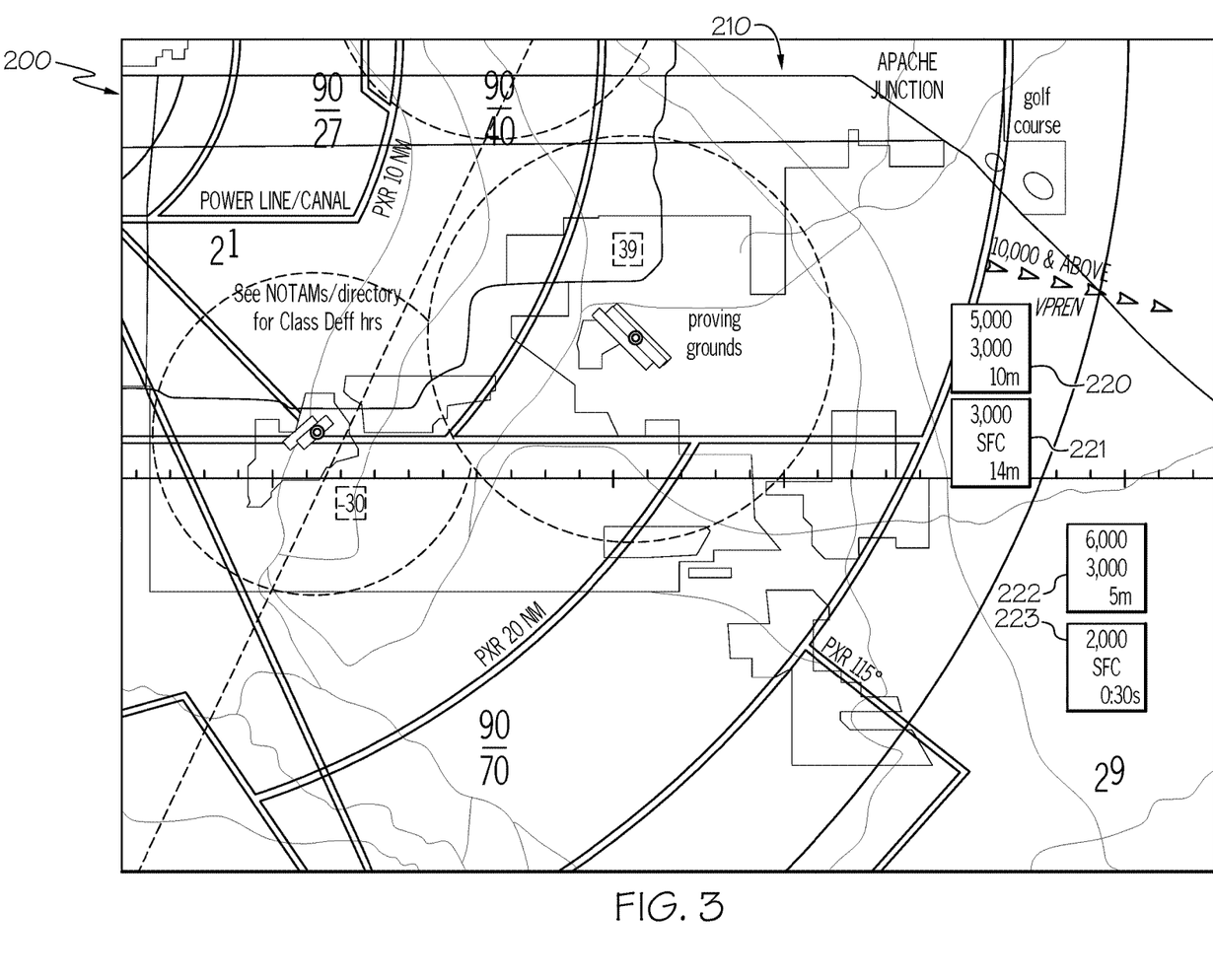
FIGS. 3-9 are visual displays generated by the practice airspace management system of FIG. 1 in accordance with an exemplary embodiment.

As particularly shown in FIG. 3, the navigation map 210 includes terrain features (e.g., feature 212), geographic locations (e.g., airport 214), range lines (e.g., line 216), and other types of information, such as, for example, waypoints, navigational aids, obstructions, special use airspace, political boundaries, communication frequencies, aircraft information, protected airspace data, and any type of relevant data. As noted above, the map module 114 may generate the navigation map and associated symbology (e.g., based on data from database 130, flight management system 170, and/or communications unit 160) and provide the map information to the schedule module 112 for management of the training plans and/or the display module 118 for display to the user.

As also shown in FIG. 3, the visual display 200 includes information associated with other aircraft training plans as training plan symbols 220, 221, 222, 223. As noted above, the other aircraft training plans represented by the training plan symbols 220-223 have been created for other aircraft by other users. The other aircraft training plan symbols 220-223 may be presented on the visual display 200 from information generated by the message module 120 based on messages received via the communications unit 160. In some embodiments, the other aircraft training plan systems 220-223 may be generated and/or otherwise appear as standard TCAS or ADS-B traffic targets. The system 100 may use an ADS-B identification to link a training plan (e.g., training plans associated with training plan symbols 220-223) to a target sensed by another aspect of the system 100. The aircraft training plan symbols 220-223 are presented with symbology on the navigation map 210 as squares or other two dimensional shapes having locations and sizes representing the geographic areas in which the respective aircraft will be (or are) implementing the training plan maneuvers. In other words, the lateral extent of the training plan symbols 220-223 represents the actual lateral extent (e.g., the width and length) of the reserved airspace for the other aircraft. If the visual display 200 is implemented in a form with a vertical component (e.g., with a Vertical Situation Display (VSD), perspective view, or egocentric Synthetic Vision Display on the Primary Flight Display (PFD)), the training plan symbols 220-223 may also represent the vertical extent of the reserved airspace for the aircraft. The geographic area defined by each training plan symbol 220-223 may be referred to as a practice zone.

The training plan symbols 220-223 may also include details about the respective training plans, such as the designated altitudes and timing of the training plan maneuvers. For example, training plan symbol 220 indicates that an aircraft will be occupying the airspace in the geographic practice zone covered by the training plan symbol 220 at altitudes 3000 feet to 5000 feet in 10 minutes from the current time. In other contexts, the training plan symbols 220-223 may include information regarding the duration and/or end time, and each type of timing information may be adjusted in real time based on a real time data feed containing information on aircraft startup and taxi time, climb rate, and groundspeed, as examples. In some embodiments, the training plan symbols 220-223 may be semi-transparent to depict the underlying navigation map information. User selection of the training plan symbol 220-223 (e.g., with the input device 150) may result in the schedule module 112 and the display module 118 presenting additional details regarding the respective training plan on the display device 140.

To initiate creation of an ownship training plan, the user may select a practice zone on the navigation map 210. In one exemplary embodiment, the navigation map 210 may be subdivided into a number of potential practice zones of predetermined size and/or a size based on other factors. For example, the potential practice zones may be regular sizes, defined by latitude/longitude, nautical mile rectangles, or irregular sizes, defined by geographical features such as roads, city boundaries, lakes, mountain features and ranges, landmarks, human made structures, etc. These potential practice zones may be visible or invisible to the user, or potential practice zones may be indicated by an absence of symbology representing restricted areas. Generally, the practice zones may be defined by the schedule module 112 and/or the display module 118 based on information from the map module 114.

In one embodiment, potential practice zones may be shown outside of restricted areas and terminal airspace and at available altitudes in a manner that indicates the availability, such as in a lighter or subdued color prior to selection. Typically, the map module 114 may perform area or error checking to determine the available areas and altitudes for the potential practice zones.

Figure 4:
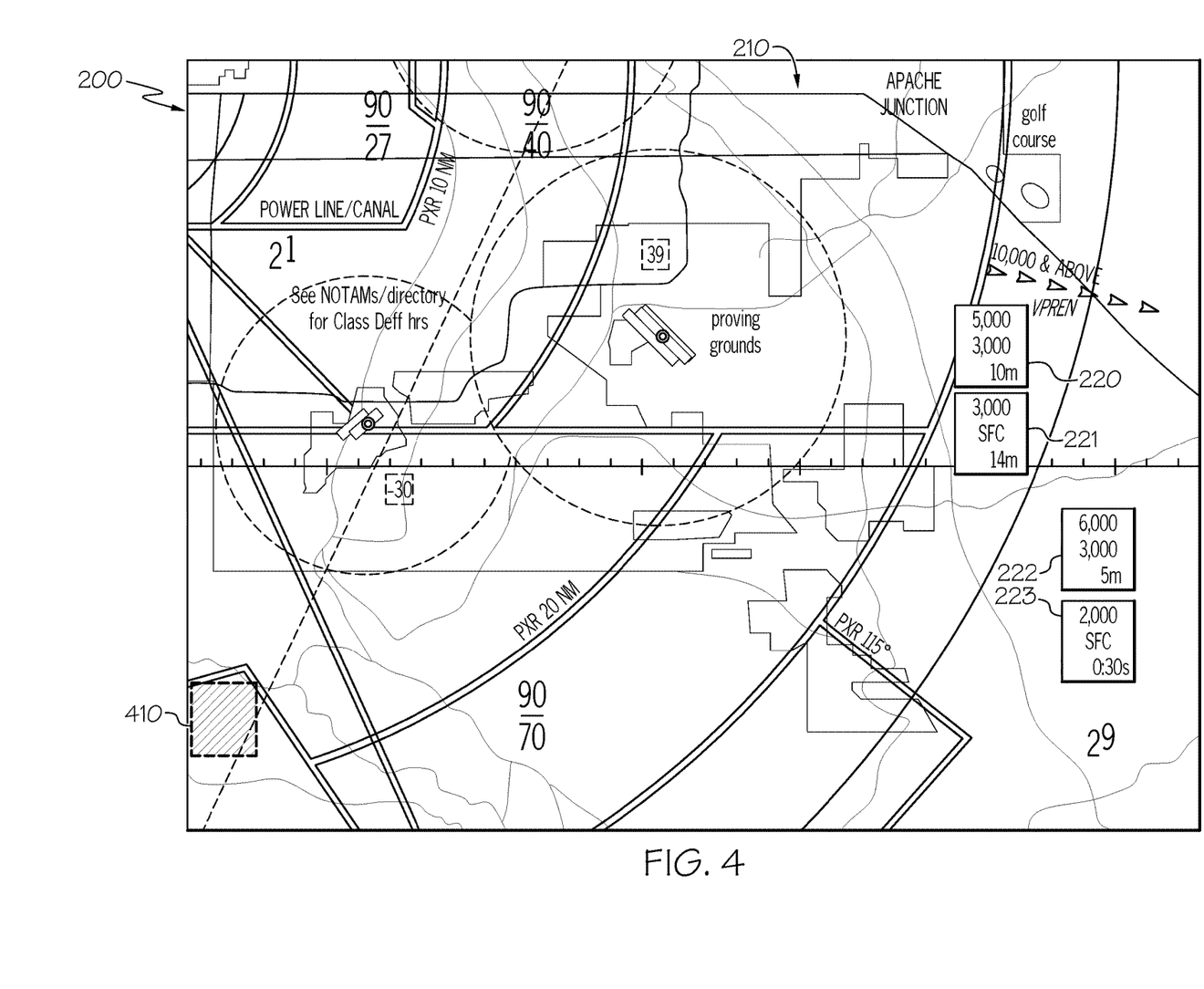

In one exemplary embodiment, the user may select one of the potential practice zones on the navigation map 210, e.g., with the input device 150, and the schedule module 112 receives the selection to create an ownship training plan for the selected practice zone. Effectively, the selection of the practice zone and creation of the training plan functions to reserve a designated block of practice airspace for the user. Reference is briefly made to FIG. 4 in which, upon selection of the practice zone on the navigation map 210, the schedule module 112 and/or display module 118 creates a training plan symbol 410 for the user that covers the selected practice zone on the navigation map 210. As above, the training plan symbol 410 has a size and shape that corresponds to the size and shape of the lateral airspace in which the ownship aircraft will be implementing the training plan, e.g., in effect, representing the area reserved by the user. In other words, position of the boundary of the training plan symbol 410 represents the geographic lateral boundary of the training plan. Further as noted above, the vertical boundary (e.g., the altitude limits) of the training plan may be displayed when the visual display has a vertical dimension. The training plan symbol 410 may have a color or appearance to distinguish the ownship training plan symbol 410 relative to the other aircraft training plan symbols 220-223, which are also depicted in FIG. 4.

As described below, information associated with the ownship training plan may be shared with other users in the area. For example, the message module 120 may format and send messages to other aircraft and/or control centers via the communications unit 160. In one embodiment, the message module 120 initiates the sending of such messages upon selection of the practice area, while in other embodiments, the message module 120 may send such messages after completion of the creation of the training plan, as described below.

Figure 5:
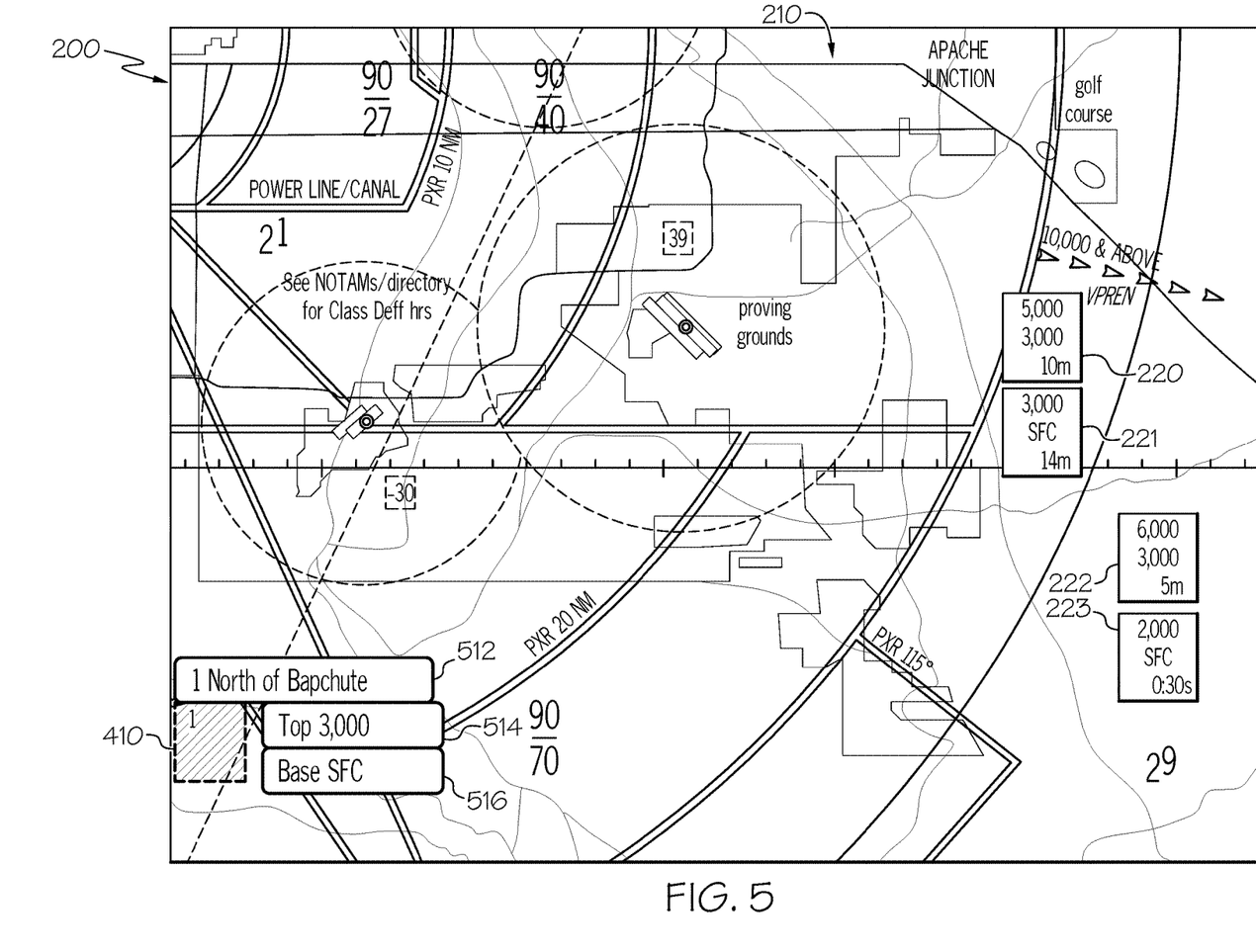

Now referring to FIG. 5, the schedule module 112 cooperates with the display module 118 to present interactive menus and/or other graphical user interface elements to the user to further define the ownship training plans. For example, input fields 512, 514, 516 may be displayed on or proximate to the training plan symbol 410 to enable receipt of additional user input. As shown in FIG. 5, the user may define a training plan name in a first input field 512. The training plan name may be, as an example, a description of the geographic area of the associated practice zone. As other examples, the training plan name may include an aircraft or user identifier. In some instances, the training plan name may be predefined or suggested by the schedule module 112. As noted above, the training plan may be identified according to ADS-B identifier such that the training plan may be associated with the ownship. Further, this identification may be used to associated other traffic with training plans to link training plans with aircraft in real time, during flight.

As also shown in FIG. 5, the user may define or select an upper and lower altitude range in input fields 514, 516. In the depicted example, the input fields 514, 516 indicate that the altitude range of the training plan represented by training plan symbol 410 is between the surface and 3000 feet. Suitable altitude ranges may be defined by the user and/or based on the real-world terrain and/or obstacles within the practice zone, and/or by regulations set forth by a governmental and/or regulatory body or airline company or operator.

Figure 6:
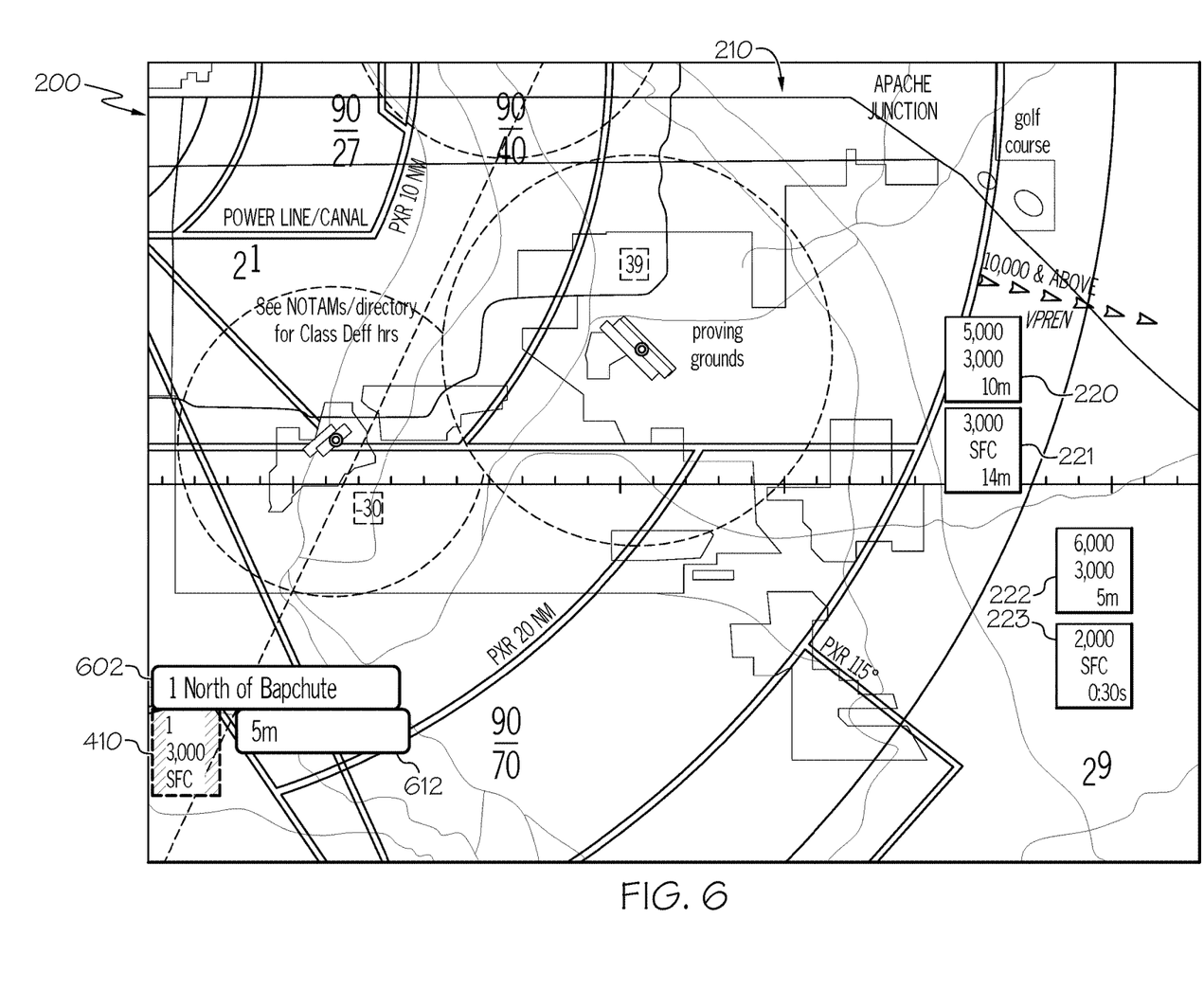

Upon entering selections in input fields 514, 516, the training plan characteristics defined in input fields 512, 514, 516 are associated with the training plan by the schedule module 112 and may be presented on the visual display 200. For example, in FIG. 6, the training name 602 and altitude characteristics 604, 606 are displayed on the visual display 200. As also depicted in FIG. 6, the schedule module 112 may cooperate with the display module 118 to present input field 612 to receive additional training plan characteristics, such as a time characteristic. For example, in FIG. 6, the user has entered 5 minutes into the field 612, indicating that the user anticipates implementing the training plan in 5 minutes.

In one embodiment, the timing elements (e.g., such as timing element in field 612) may be auto-filled based on statistics associated with the operator (e.g., the instructor or student) and/or the associated maneuvers. Such statistics may have other functions, including evaluation of an operator or maneuver, e.g., to determine how long a maneuver takes, trends, etc., thereby providing the efficient use an release of airspace.

Figure 7:
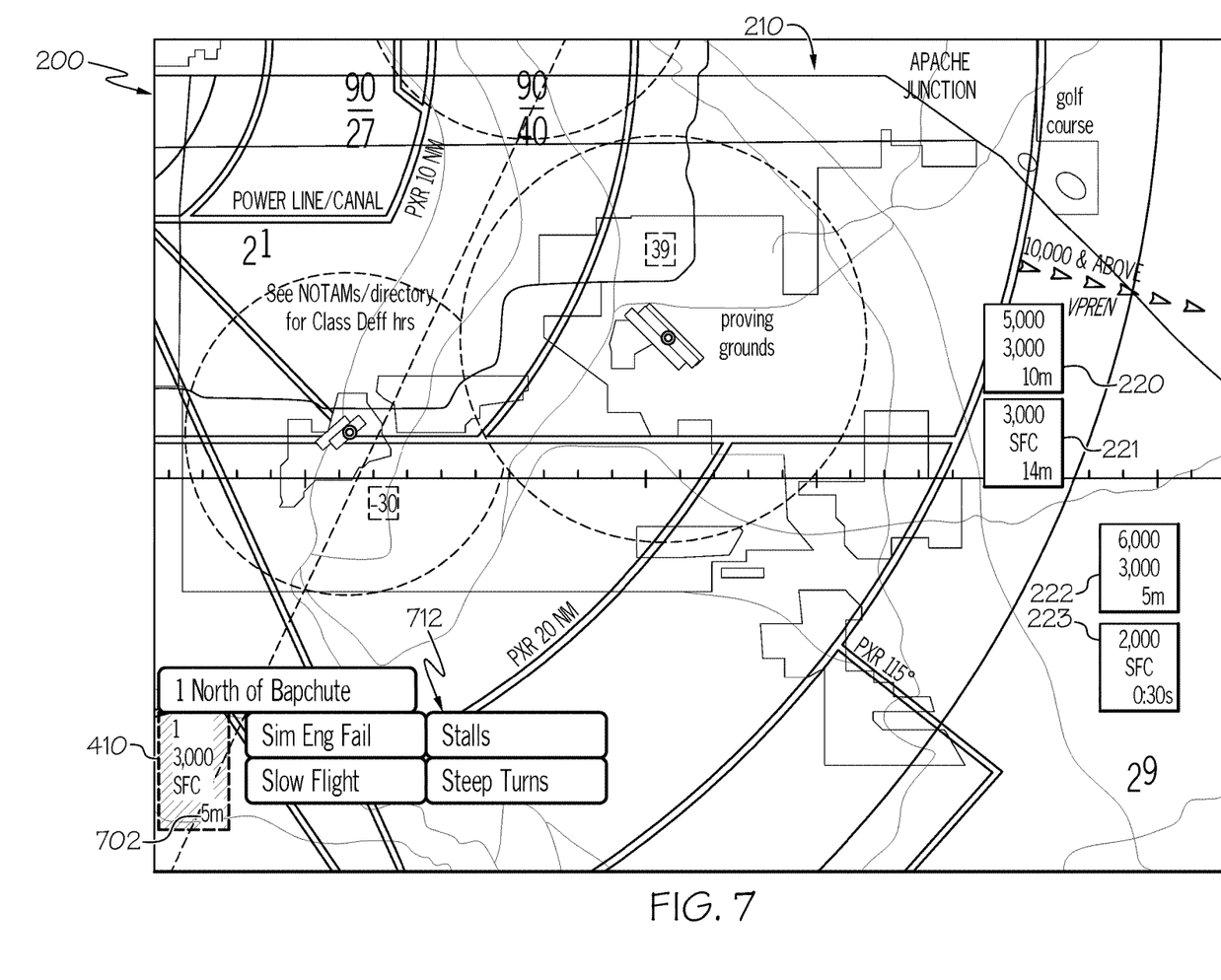

Upon entering a selection in input field 612, the training plan characteristic defined in input field 612 is associated with the training plan by the schedule module 112 and may be presented on the visual display 200. For example, in FIG. 7, the time characteristic 702 is displayed on the visual display 200. As also depicted in FIG. 7, the schedule module 112 may cooperate with the display module 118 to present menu 712 to receive additional training plan characteristics, such as planned maneuver characteristics. For example, in FIG. 7, the user may select from a menu 712 of potential maneuvers (e.g. simulated engine failure, slow flight, stalls, etc.), thereby creating a list or schedule of planned maneuvers.

Figure 8:
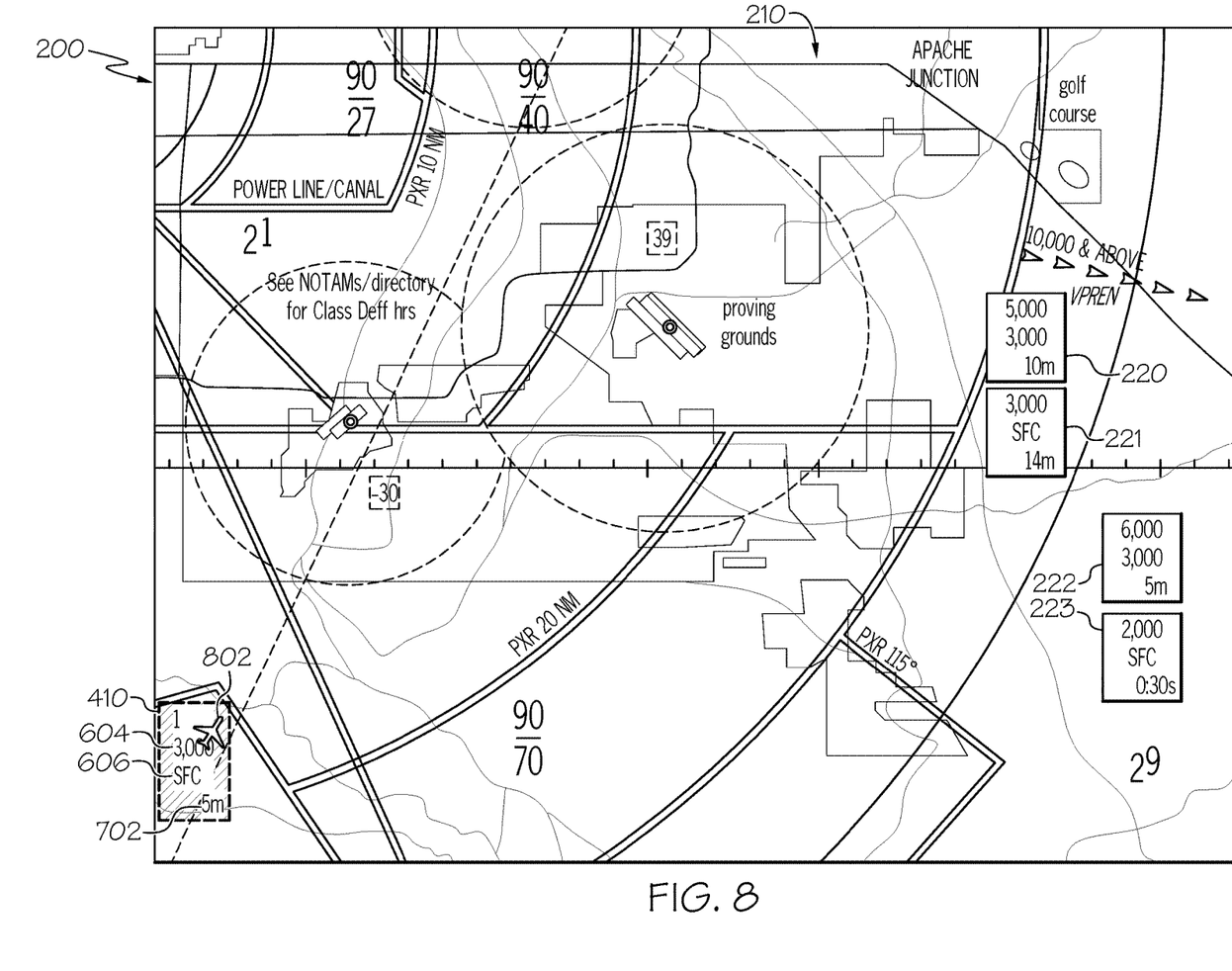
Figure 9:
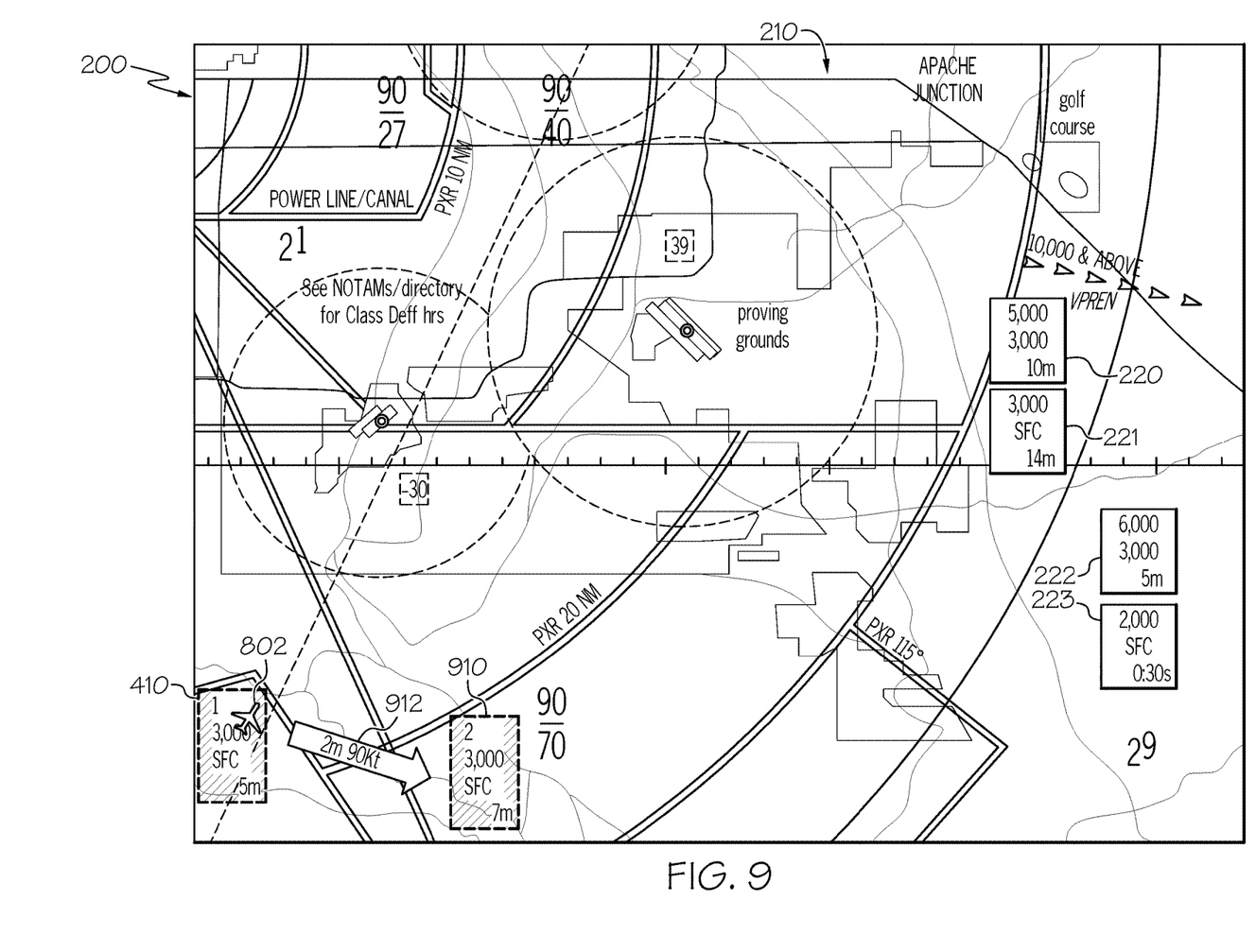

Upon completing selection of maneuver characteristics, the schedule module 112 associates the maneuver characteristics with the training plan, and the display module 118 maintains the training plan symbol 410 on the visual display 200, as depicted in the example of FIG. 8. One or more training plan characteristics representing the scheduled training plan may be presented, including the altitude characteristics 604, 606 and/or time characteristic 702. Although not shown in FIG. 8, upon selection of the training plan symbol 410 on the visual display 200, additional training plan characteristics may be presented to the user, such as the training plan name and maneuver characteristics. In some instances, the training plan symbol 410 may have a numerical designation, particularly if the user is creating multiple training plans (or multiple segments of a training plan). In such an example, the numerical designation of the training plan may indicate the intended order of execution of the training plans. In the embodiment depicted in FIG. 8, the training plan symbol 410 is designated as the first training plan (e.g. with a "1").

Generally, the schedule module 112 does not enable a user to create a training plan that interferes with an existing training plan. In other words and as noted above, the schedule module 112 may have airspace planning algorithms that identify conflicts and will prevent interference and/or alert the user to interference. In some embodiments, the schedule module 112 may enable the creation of a training plan in a practice zone with an existing training plan, if the characteristics of the training plans do not conflict. For example, in some embodiments, multiple training plans may be created for a single practice area if the altitudes or times do not overlap. Additional conflict consideration may include inappropriate altitudes for the aircraft service ceiling, airspeed, etc. In such an instance, the schedule module 112 may restrict the available characteristics for selection presented to the user during creation of the training plan to avoid interference. In some embodiments, a safety margin may be incorporated into the review of potential and scheduled training plans by the schedule module 112. Accordingly, the system 100 may protect the operator from selecting occupied or reserved airspace, choosing inappropriate altitudes or areas, and/or choosing airspace in which training is not allowed. Further, the schedule module 112 may consider real time flight or navigation information regarding potential interference. For example, the schedule module 112 may not allow reservation of a practice area by an aircraft that is 10 minutes away from the practice area that is scheduled for use in 5 minutes by another aircraft. Generally, the schedule module 112 may consider updates by the user by releasing airspace or adjusting time or altitude, or further could be based on actual aircraft taxi time (e.g., a late taxi means late to the practice area).

Additionally, during flight and/or execution of the training plan, the system 100 may monitor input data and update the visual display 200 for the user. For example, based on information from the ownship module 116, the schedule module 112 and/or display module 118 may update the appearance of the navigation map 210 and training plan symbols 230-233, 410, as appropriate. Although depicted as a static display, the visual display 200 may be centered on the aircraft symbol 802 and be updated based on aircraft position. Further, the visual display 200 may be rendered as a north-up, track-based, or heading-based orientation. In some embodiments, the system 100 may monitor the other training plan characteristics and/or the position of the other aircraft to remove the other training plan symbols 220-223 upon completion of the respective training plans. Similarly, based on ownship flight information and/or timing information, the schedule module 112 and/or display module 118 may update or remove the ownship training plan symbol 410. As noted above, the system 100 may use an ADS-B identification to link a training plan to a target sensed by another aspect of the aircraft.

Current flight characteristics may be represented on the visual display 200. As an example, FIG. 8 additionally depicts an aircraft symbol 802 on the visual display 200 that represents the current geographic position of the aircraft relative to the navigation map 210. The position of the aircraft symbol 802 relative to the training plan symbol 410 may additionally indicate the position of the aircraft within the practice zone. As such, if the aircraft symbol 802 approaches the boundary or goes outside of the boundary of the training plan symbol 410, the user may take action to return to the designated practice zone.

In some embodiments, the visual display 200 provides advisory or warning indicia for the position of the aircraft relative to the training plan. For example, if the aircraft symbol 802 is proximate to or outside of the boundaries of the training plan symbol 410, thus indicating that the aircraft may be approaching or exceeding the geographical limits of the training plan zone), the appearance of the training plan symbol 410 may be modified. For example, when the aircraft symbol 802 is proximate to the boundary of the training plan symbol 410, the training plan symbol 410 may be rendered in a yellow color, or when the aircraft symbol 802 is outside of the boundary of the training plan symbol 410, the training plan symbol may be rendered in a red color. The control unit 110 may initiate similar indicia for approaching or exceeding the time and altitude characteristics of the training plan.

Generally, the color or other symbology associated with the training plan symbols 220-223 may reflect a number of different types of information. For example, a green color may indicate that the associated aircraft is presently implementing the training plan in the area indicated by the training plan symbol 220-223. A blue color may indicate a future use of the training plan in the area indicated by the training plan symbol 220-223. Similarly, the color may reflect advisory or warning indicia may also be presented for other aircraft. For example, if the aircraft associated with training plan symbol 221 (or another aircraft that did not reserve the respective training plan area) is positioned within the area represented by training plan symbol 220, the training plan symbol 220 may be presented with a yellow or red color to indicate that an aircraft is intruding into the airspace of another training plan.

As noted above, the user may modify an existing training plan by selecting the training plan symbol and editing the characteristic fields discussed above. Additionally, the user may create additional training plans, for example, by selecting an additional zone on the navigation map 210 and providing user inputs to the system 100 similar to those discussed above. For example, with reference to FIG. 9, the user may create a second ownship training plan symbol 910. In one exemplary embodiment, the system 100 may provide a representation of the separation 912 between the zones of the training plan symbols 410, 910 in either time or distance to facilitate an ordered execution of the training plans represented by the two training plan symbols 410, 910. The separation 912 may be determined as a transit time between training plans as a statistic value represented by the arrow.

Referring again to FIG. 2, upon creation of one or more training plans, the message module 120 of the control unit 110 may generate a message containing information associated with the training plans. In one exemplary embodiment, the communications unit 160 may send such messages to a command center or other aircraft. In effect, the training plans created by the user may be presented to other aircraft as other aircraft training plans for the consideration and evaluation of other users that are also creating and/or executing training plans.

As such, the position and appearance of the images and other symbology on the visual display 200 may be dynamically generated by the control unit 110 on the display device 140. Although various examples of symbology are presented in FIGS. 3-9, any suitable type or manner of symbology may be used, and in various embodiments, one or more of the types of training plan symbology may be omitted and/or supplemented.

Although an example of the system 100 has been presented from the perspective of an ownship user, in one embodiment, the system 100 may be considered shared or "crowdsourced" across all user or affiliated users within an area. For example, each aircraft may create a training plan for the system to present on a common display for all such training plans. In effect, the system 100 may be implemented as an "application" on a mobile device. Further, embodiments disclosed above are typically used for training flights within a geographic area, and not for ordinary flight traffic (e.g., flight plans for traveling from point A to point B). Although not shown, the visual display 200 may implement or present a timeline or timelapse function, for example as a timeline slider, that may be used to view an integration of training plans in space and time into the future.

Although a system 100 and visual displays 200 are depicted in FIGS. 1-9, exemplary embodiments may additionally include a method for displaying practice airspace information for an ownship aircraft and other aircraft in the area. As an example, the method may include displaying a navigation map view of a surrounding area; receiving and displaying training plan information for other aircraft in the area; receiving user input selecting a location and characteristics for an ownship training plan; displaying training plan symbology on the navigation map view; and updating the navigation map view based on updated flight information and/or upon modification of the training plans.

Accordingly, exemplary embodiments enable management of practice airspace information in a manner that is intuitive and graphically integrated with other types of flight information. Particularly, exemplary embodiments provide such symbology as a quick snapshot of the position and characteristics of training plans in an area. In general, such symbology facilitates flight crew or operator situational awareness and vehicle control, which reduces pilot or operator workload and navigation errors, and thus results in increased aircraft and/or navigation safety.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A practice airspace management system, comprising:
   a control unit configured to receive, from a first user, user inputs selecting, on a navigation map, a practice zone of airspace, the practice zone of airspace having a size, and to generate a first training plan based on the user inputs, thereby designating and reserving the practice zone of airspace on the navigation map for the first training plan, the control unit further configured to generate display commands representing the first training plan on a navigation map; and
   a display device coupled to receive the display commands from the control unit and configured to display a navigation map view that includes the navigation map and a first training plan symbol representing a geographic lateral boundary of the first training plan on the navigation map.

2. The practice airspace management system of claim 1, further comprising a communications unit coupled to the control unit and configured to receive at least one second training plan from a second user and to provide the second training plan to the control unit, and wherein the control unit is configured to generate the display commands with the second training plan such that the display device is configured to display the navigation map view with a second training plan symbol representing a geographic lateral boundary of the second training plan on the navigation map.

3. The practice airspace management system of claim 1, further comprising a communications unit coupled to the control unit and configured to send a message to a control center with the first training plan.

4. The practice airspace management system of claim 1, wherein the control unit is further configured to receive current ownship flight information, and wherein the display device is configured to display an aircraft symbol on the navigation map based on the current ownship flight information.

5. The practice airspace management system of claim 1, wherein the display device is configured to display the first training plan symbol at a geographic location on the navigation map representing a practice zone associated with the first training plan.

6. The practice airspace management system of claim 5, wherein the first training plan symbol has a different appearance than the second training plan symbol.

7. The practice airspace management system of claim 5, wherein the second training plan is identified according to an ADS-B identification.

8. The practice airspace management system of claim 1, wherein the user inputs selecting the practice zone of airspace include a geographic location, a lateral boundary, and an altitude range for the first training plan.

9. The practice airspace management system of claim 8, wherein the control unit is configured to receive the user inputs selecting the practice zone of airspace as user selections on the navigation map representing the geographic location, the lateral boundary, and altitude range for the first training plan.

10. The practice airspace management system of claim 8, wherein the display device is configured to display symbology representing the altitude range for the first training plan with the first training plan symbol.

11. The practice airspace management system of claim 8, wherein the control unit is further configured to receive the user inputs selecting the practice zone of airspace as user selections from a menu element to define a list of practice maneuvers to form part of the first training plan.

12. A method of managing practice airspace, comprising:
   receiving, at a control unit, user inputs from a first user, the user inputs selecting, on a navigation map, a practice zone of airspace, the practice zone of airspace having a size;
   generating, with the control unit, a first training plan based on the user inputs thereby designating and reserving the practice zone of airspace on the lateral map for the first training plan;
   generating, with the control unit, display commands representing the first training plan on the navigation map; and
   displaying, on a display device and based on the display commands, a navigation map view that includes the navigation map and a first training plan symbol representing a geographic lateral boundary of the first training plan on the navigation map.

13. The method of claim 12,
   receiving, with a communications unit, at least one second training plan from a second user; and
   displaying the navigation map view with a second training plan symbol representing a geographic lateral boundary of the second training plan on the navigation map.

14. The method of claim 13, wherein the displaying step includes displaying the first training plan symbol with a different appearance than the second training plan symbol.

15. The method of claim 14, wherein the receiving step includes receiving the user inputs from a user input device to define a geographic location, a lateral boundary, and an altitude range for the first training plan.

16. The method of claim 15, wherein the receiving step includes receiving the user inputs as user selections on the navigation map representing the geographic location, the lateral boundary, and altitude range for the first training plan.

17. The method of claim 16, wherein the received user inputs further include user selections from a menu element to define a list of practice maneuvers to form part of the first training plan.

* * * * *